United States Patent
Takada et al.

(10) Patent No.: US 10,439,842 B2
(45) Date of Patent: Oct. 8, 2019

(54) RELAY DEVICE

(71) Applicants: NATIONAL UNIVERSITY CORPORATION NAGOYA UNIVERSITY, Nagoya-shi, Aichi (JP); AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hiroaki Takada, Nagoya (JP); Ryo Kurachi, Nagoya (JP); Hiroshi Ueda, Yokkaichi (JP)

(73) Assignees: NATIONAL UNIVERSITY CORPORATION NAGOYA UNIVERSITY, Nagoya-shi (JP); AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 65 days.

(21) Appl. No.: 15/753,663

(22) PCT Filed: Aug. 19, 2016

(86) PCT No.: PCT/JP2016/074225
§ 371 (c)(1),
(2) Date: Feb. 20, 2018

(87) PCT Pub. No.: WO2017/038500
PCT Pub. Date: Mar. 9, 2017

(65) Prior Publication Data
US 2019/0007234 A1  Jan. 3, 2019

(30) Foreign Application Priority Data

Aug. 31, 2015 (JP) .................................. 2015-171190

(51) Int. Cl.
*H04L 12/46* (2006.01)
*H04L 12/40* (2006.01)

(52) U.S. Cl.
CPC .............. *H04L 12/46* (2013.01); *H04L 12/40* (2013.01); *H04L 12/4625* (2013.01); *H04L 2012/40215* (2013.01)

(58) Field of Classification Search
None
See application file for complete search history.

(56) References Cited

U.S. PATENT DOCUMENTS

| 6,226,260 | B1 | 5/2001 | McDysan |
| 2003/0112820 | A1* | 6/2003 | Beach ................ H04L 12/4625 370/465 |

(Continued)

FOREIGN PATENT DOCUMENTS

| JP | S54-121707 U | 8/1979 |
| JP | H03-031181 A | 2/1991 |

(Continued)

OTHER PUBLICATIONS

Koscher et al., "Experimental Security Analysis of a Modern Automobile," In Proc. of the IEEE Symposium on Security and Privacy, 2010, pp. 447-462.

(Continued)

*Primary Examiner* — Shripal K Khajuria
(74) *Attorney, Agent, or Firm* — Oliff PLC

(57) ABSTRACT

A relay device capable of preventing transmission of an improper message to one or more networks even if improper falsification is made to a program for executing relay processing. If one CAN controller receives a message, a (Continued)

gateway stores the received message in the message storage unit and also sends the message to the processing unit. The processing unit that received the message performs processing necessary for relay of the message by executing a relay program, and sends the message to be relayed to the CAN controller. The gateway compares the message before being sent from the CAN controller to the processing unit with the message sent from the processing unit to the CAN controller, to determine the properness of the message.

9 Claims, 11 Drawing Sheets

(56) References Cited

U.S. PATENT DOCUMENTS

| | | | | |
|---|---|---|---|---|
| 2003/0172189 A1* | 9/2003 | Greenblat | ............... | G06F 15/78 709/251 |
| 2009/0185571 A1* | 7/2009 | Tallet | ............... | H04L 12/4625 370/401 |
| 2012/0044935 A1* | 2/2012 | Hama | ............... | H04L 12/4625 370/389 |
| 2014/0355518 A1* | 12/2014 | Brown | ............... | H04W 88/16 370/328 |
| 2015/0358351 A1* | 12/2015 | Otsuka | ............... | H04L 12/4625 726/23 |
| 2018/0054414 A1* | 2/2018 | LeVasseur | ............ | G06F 21/445 |

FOREIGN PATENT DOCUMENTS

| | | |
|---|---|---|
| JP | H03-066242 A | 3/1991 |
| JP | 2000-209236 A | 7/2000 |
| JP | 2009-298499 A | 12/2009 |
| JP | 2011-103577 A | 5/2011 |
| JP | 2014-86812 A | 5/2014 |

OTHER PUBLICATIONS

Ujiie et al., "Proposition on CAN filtering Technology for In-Vehicle Network," Symposium on Cryptography and Information Security (SCIS2015), 2015.

Mizrak et al., "Faith: detecting and isolating malicious routers," Proceedings of the 2005 International Conference on Dependable Systems and Networks (DSN'05), 2005, pp. 538-547.

Oct. 25, 2016 International Search Report issued in International Patent Application No. PCT/JP2016/074225.

* cited by examiner

RECEIVED MESSAGES

| HEADER PORTION | DATA 1 | FOOTER PORTION |
|---|---|---|
| HEADER PORTION | DATA 2 | FOOTER PORTION |
| HEADER PORTION | DATA 3 | FOOTER PORTION |

INTEGRATION OF MESSAGES

| HEADER PORTION | DATA 1 | DATA 2 | DATA 3 | FOOTER PORTION |
|---|---|---|---|---|

MESSAGE FOR RELAY

FIG. 9

DETERMINATION CONDITION

| TRANSFER SOURCE INFORMATION | | | | TRANSFER DESTINATION INFORMATION | | | | |
|---|---|---|---|---|---|---|---|---|
| RELAY SOURCE COMMUNICATION LINE | CAN-ID | DATA COMPARISON RANGE | CRC NECESSITY | RELAY DESTINATION COMMUNICATION LINE | CAN-ID | DATA COMPARISON RANGE | COMPARISON METHOD | RELAY RULE |
| ... | ... | ... | ... | ... | ... | ... | ... | ... |
| COMMUNICATION LINE 2 | 2 | 0~63 | UNNECESSARY | COMMUNICATION LINE 3 | 2 | 0~63 | METHOD 1 | RULE 1 |
| COMMUNICATION LINE 2 | 10 | 0~7 | UNNECESSARY | COMMUNICATION LINE 3 | 10 | 0~7 | METHOD 1 | RULE 2 |
| COMMUNICATION LINE 2 | 10 | 8~63 | UNNECESSARY | COMMUNICATION LINE 3 | 20 | 8~63 | METHOD 1 | RULE 2 |
| COMMUNICATION LINE 2 | 30 | — | NECESSARY | COMMUNICATION LINE 3 | 30 | — | METHOD 2 | RULE 2 |
| ... | ... | ... | ... | ... | ... | ... | ... | ... |

RELAY DEVICE

CROSS-REFERENCE TO RELATED APPLICATIONS

This application is the national phase under 35 U.S.C. § 371 of PCT International Application No. PCT/JP2016/074225 which has an International filing date of Aug. 19, 2016 and designated the United States of America.

FIELD

The present disclosure relates to a relay device performing processing of relaying a message between multiple networks.

BACKGROUND

Conventionally, multiple electronic control units (ECUs) are mounted to a vehicle and are connected with each other via a network such as a controller area network (CAN).

The multiple ECUs perform individual processing while exchanging information through the network. In recent years, the scale of in-vehicle networks tends to be increased, where such a structure is often employed that multiple small-sized networks are connected to a relay device such as a gateway, which relays a message between the networks.

Japanese Patent Application Laid-Open No. 2014-86812 describes a CAN system which aims to enhance fault tolerance by transmitting a retransmission request frame if the first node in the CAN system fails to receive a frame and is in an error passive state, storing the frame transmitted to a communication line in the second node, and retransmitting the frame for which retransmission is requested to the first node.

Japanese Patent Application Laid-Open No. 2011-103577 describes a communication system that aims to prevent erroneous operation on the reception side of a frame with a configuration where a CAN controller measures a transmission latency from the input of a frame to the start of transmission to a communication line and transmits the frame together with information related to the transmission latency, while the CAN controller that received the frame decides processing to be executed in accordance with the transmission latency.

SUMMARY

K. Koscher, A. Czeskis, F. Roesner, S. Patel, T. Kohno, S. Checkoway, D. McCoy, B. Kantor, D. Anderson, H. Shacham, and S. Savage; Experimental Security Analysis of a Modern Automobile; In Proc. of the IEEE Symposium on Security and Privacy, pages 447-462, 2010, however, reports that an improper, i.e. unauthorized, message may be transmitted to a network in a vehicle by injecting an unauthorized program to the ECU. If an improper message is transmitted based on an unauthorized program, malfunction may occur in another ECU connected to the network.

For such improper message transmission, neither the CAN system according to Japanese Patent Application Laid-Open No. 2014-86812 nor the communication system according to Japanese Patent Application Laid-Open No. 2011-103577 could present effective measures.

Moreover, Yoshihiro Ujiie, Takeshi Kishikawa, Tomoyuki Haga, Hideki Matsushima, Masato Tanabe, Yoshihiko Kitamura, Jun Anzai; Proposition on CAN filter in In-Vehicle Network, Symposium on Cryptography and Security (SCIS2015), 2015 proposes a method of detecting improper message transmission by performing a filtering process based on conditions such as the ID, DLC, transmission cycle and transmission frequency of a CAN message. It is expected that relay of an improper message from one network to another network may be prevented by, for example, a relay device performing the filtering process according to Yoshihiro Ujiie, Takeshi Kishikawa, Tomoyuki Haga, Hideki Matsushima, Masato Tanabe, Yoshihiko Kitamura, Jun Anzai; Proposition on CAN filter in In-Vehicle Network, Symposium on Cryptography and Security (SCIS2015), 2015. If, however, a program for such a filtering process is falsified, the filtering process itself may be invalidated.

The present disclosure has been made in view of the circumstances described above, and aims to provide a relay device that can prevent transmission of an improper message to one or more networks even if improper falsification is made to a program for performing relay processing.

A relay device according to an aspect of the present disclosure that includes multiple communication units each of which is connected to a communication line to perform transmission and reception of a message through the communication line, and relays a message between the communication units, comprises: a message storage unit in which a message received by the communication unit is stored; a program storage unit in which a software program for executing relay processing of a message is stored; a processing unit executing the software program stored in the program storage unit to perform relay processing of a message; and a determination unit determining the properness of a message to be relayed in the case where the message to be relayed is sent from the processing unit to the communication unit, based on a message stored in the message storage unit, wherein in a case of receiving a message at one communication unit, the message is stored in the message storage unit while being sent to the processing unit, the processing unit outputs a message for relay that is to be transmitted by a different communication unit based on a sent message, and the determination unit compares the message for relay output by the processing unit with a message stored in the message storage unit to determine properness of the message for relay, and sends the message for relay determined as proper to the different communication unit.

Moreover, the relay device according to another aspect of the present disclosure, further comprising a prohibition unit that prohibits transmission by the communication unit of a message determined as improper by the determination unit.

Moreover, the relay device according to another aspect of the present disclosure, wherein the determination unit determines that a message to be relayed that is sent from the processing unit to the communication unit is proper if the message to be relayed matches with a message stored in the message storage unit.

Moreover, the relay device according to another aspect of the present disclosure, wherein the determination unit determines that a message to be relayed that is sent from the processing unit to the communication unit is proper if the message to be relayed matches with any one of messages stored in the message storage unit, and the message storage unit deletes the message determined as proper by the determination unit and relayed.

Moreover, the relay device according to another aspect of the present disclosure, wherein the determination unit determines that a message to be relayed that is sent from the processing unit to the communication unit is proper if one portion of the message to be relayed matches with one portion of a message stored in the message storage unit.

Moreover, the relay device according to another aspect of the present disclosure, wherein the message is a message in accordance with a CAN communication protocol, and the one portion corresponds to an ID and a CRC contained in the message.

Moreover, the relay device according to another aspect of the present disclosure, wherein the processing unit executes the software program stored in the program storage unit to generate a message for relay by integrating multiple messages obtained from one or more communication units, and the determination unit determines that the message for relay that is sent from the processing unit to the communication unit is proper if one portion of the message for relay matches with one portion of one or more messages stored in the message storage unit.

Moreover, the relay device according to another aspect of the present disclosure, wherein the processing unit executes the software program stored in the program storage unit to generate a plurality of messages for relay by dividing a message obtained from the communication unit, and the determination unit determines that the messages for relay that are sent from the processing unit to the communication unit are proper if one portion of the messages for relay matches with one portion of a message stored in the message storage unit.

Moreover, the relay device according to another aspect of the present disclosure, comprising a detection unit that detects falsification to a transmitted message while the communication unit transmits a message determined as proper by the determination unit and an abort unit that aborts message transmission by the communication unit if the detection unit detects falsification.

According to one aspect of the present disclosure, the relay device comprises multiple communication units each of which is connected to a communication line, and executes a software program by a processing unit to perform message relay processing in which a message received by one communication unit is transmitted from another communication unit. The relay device comprises, separately from the processing unit, a storage unit in which a message received by a communication unit is stored. In the case where a message is received by one communication unit from another ECU or the like through a communication line, the message received by the communication unit is stored in the storage unit and is also sent to the processing unit. The processing unit to which the message is sent performs processing necessary for relay of the message, e.g., scheduling of the message, by executing a software program. The processing unit sends a message to be relayed to a communication unit connected to an ECU or the like which is to relay this message. The communication unit to which the message to be relayed is sent from the processing unit transmits the message by outputting a signal according to the message onto the corresponding communication line.

Here, in the case where the message to be relayed is sent from the processing unit to the communication unit, the relay device according to the present disclosure determines the properness of the message based on the message stored in the storage unit, and prohibits transmission of any message determined as improper.

Comparing the message before being sent to the processing unit with the message being sent from the processing unit, the relay device may determine the properness of the message. That is, the relay device may determine whether or not the message to be relayed is not falsified in the processing unit, which can prevent the relay device from transmitting an improper message to another device such as an ECU.

According to another aspect of the present disclosure, the relay device determines whether or not the message to be relayed is proper by determining whether or not the message to be relayed that is sent from the processing unit to the communication unit matches with the message stored in the storage unit. This allows the relay device to reliably determine the presence or absence of falsification of a message by merely performing simple comparison processing.

According to a further aspect of the present disclosure, the storage unit in the relay device is configured to be able to store multiple messages received by the communication unit. In the case where a message to be relayed is sent from the processing unit, the relay device determines that the message is proper if the sent message matches with any one of the messages stored in the storage unit. Accordingly, even if processing such as scheduling is performed in the processing unit and the order of relay is different from the order of reception, the relay device may reliably determine the presence or absence of falsification of a message.

According to another aspect of the present disclosure, determination on the properness of the message to be relayed is made by determining whether or not a portion of the message to be relayed that is sent from the processing unit to the communication unit matches with a portion of the message stored in the storage unit. By comparing portions of the messages, the stored content in the storage unit that stores the messages may be reduced. The portions of the messages to be compared may be ID and CRC contained in the messages according to the CAN communication protocol, for example.

Furthermore, by executing a software program, the processing unit in the relay device may integrate multiple messages or may divide one message into multiple messages, to generate a message to be relayed. The relay device according to the present disclosure determines whether or not the message to be relayed is proper by determining whether or not a portion of the message to be relayed that is sent from the processing unit to the communication unit matches with a portion of one or more messages stored in the storage unit. Accordingly, even if processing such as integration, dividing or the like of the message is performed in the processing unit, the relay device may determine the presence or absence of falsification of the message.

According to another aspect of the present disclosure, the relay device may relay a message by the communication unit outputting the message determined as proper to a communication line. Here, the relay device detects falsification to the message transmitted by the communication unit. For example, the relay device may detect falsification of a message by sampling a signal on a communication line and determining whether or not the signal is correctly transmitted, every time the communication unit outputs a signal corresponding to one bit of the message onto the communication line. If falsification of the message is detected, the relay device aborts the transmission of the message by the communication unit. Thus, the message transmission is aborted for malicious falsification by an external device made to the message transmitted by the relay device, which can prevent reception of the falsified message by another ECU or the like.

According to an aspect of the present disclosure, such a configuration that a received message is stored and a determination on whether or not a message to be relayed is proper is made based on this message, so that an improper message may be prevented from being transmitted to one or more networks even if improper falsification is made to a program for relay processing.

The above and further objects and features will more fully be apparent from the following detailed description with accompanying drawings.

BRIEF DESCRIPTION OF THE DRAWINGS

FIG. 9 is a schematic view illustrating an example of determination conditions stored in a determination condition storage unit;

DETAILED DESCRIPTION

Embodiment 1

Figure 1:
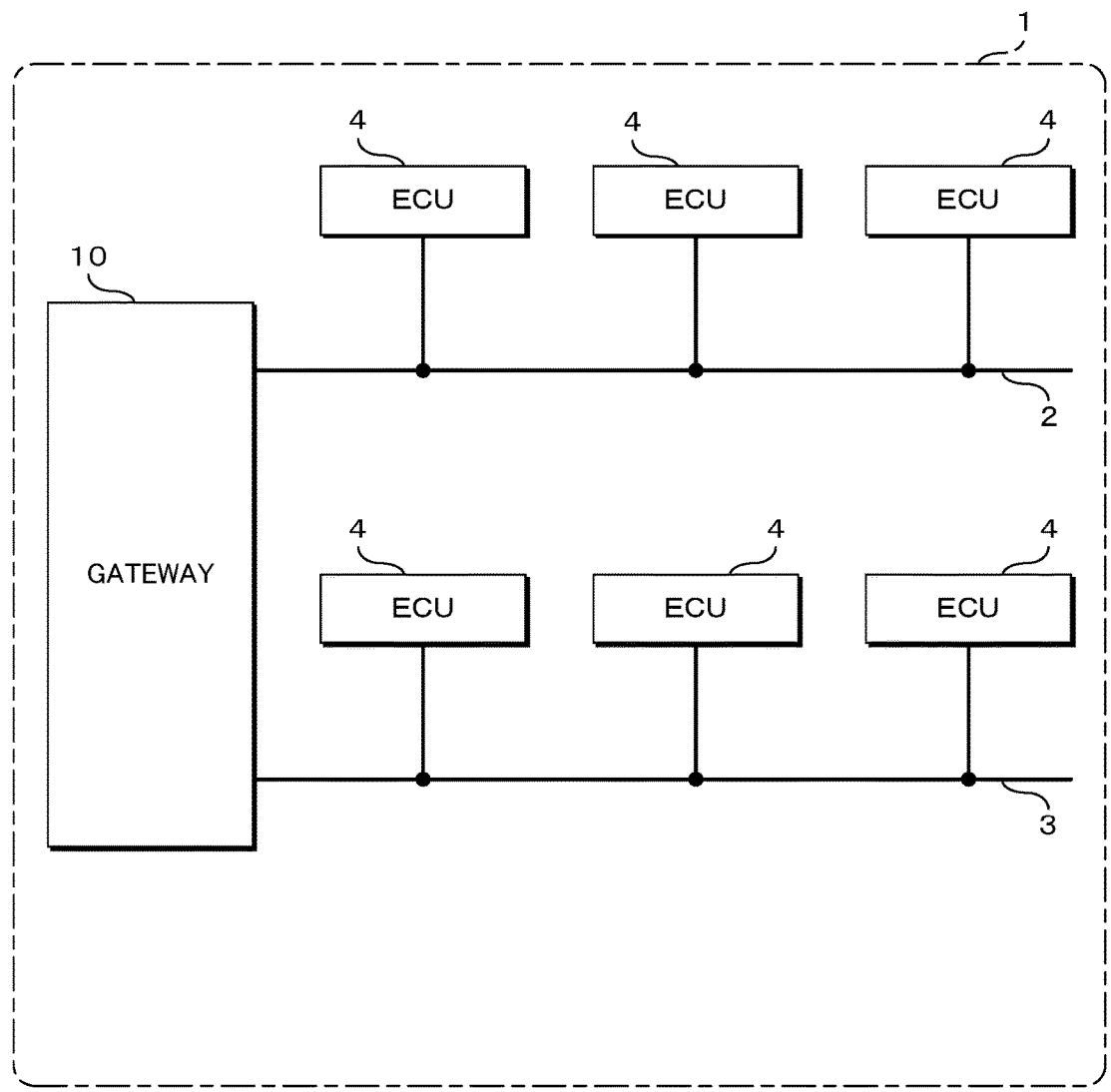
FIG. 1 is a block diagram illustrating the configuration of an in-vehicle communication system according to an embodiment of the present disclosure.

The present disclosure will specifically be described below with reference to the drawings illustrating the embodiments thereof. FIG. 1 is a block diagram illustrating the configuration of an in-vehicle communication system according to an embodiment of the present disclosure. The in-vehicle communication system according to the present embodiment is configured to include one gateway 10 and multiple electronic control units (ECUs) 4 that are mounted to a vehicle 1. In the illustrated example, six ECUs 4 are mounted to the vehicle 1 while these six ECUs 4 are divided into two groups. Three ECUs 4 in the first group are connected to the first communication line 2, through which the ECUs 4 transmit and receive messages to/from one another. Likewise, three ECUs 4 in the second group are connected to the second communication line 3, through which the ECUs 4 transmit and receive messages to/from one another.

The two communication lines 2 and 3 are not directly connected to each other but are individually connected to the gateway 10. The gateway 10 is a device that obtains a message output onto one communication line 2 for example, and outputs the obtained message to the other communication line 3, to relay the message between the groups (networks, communication lines). Accordingly, the message transmitted by the ECU 4 connected to the first communication line 2 is relayed by the gateway 10 and is received by the ECU 4 connected to the second communication line 3.

Figure 2:
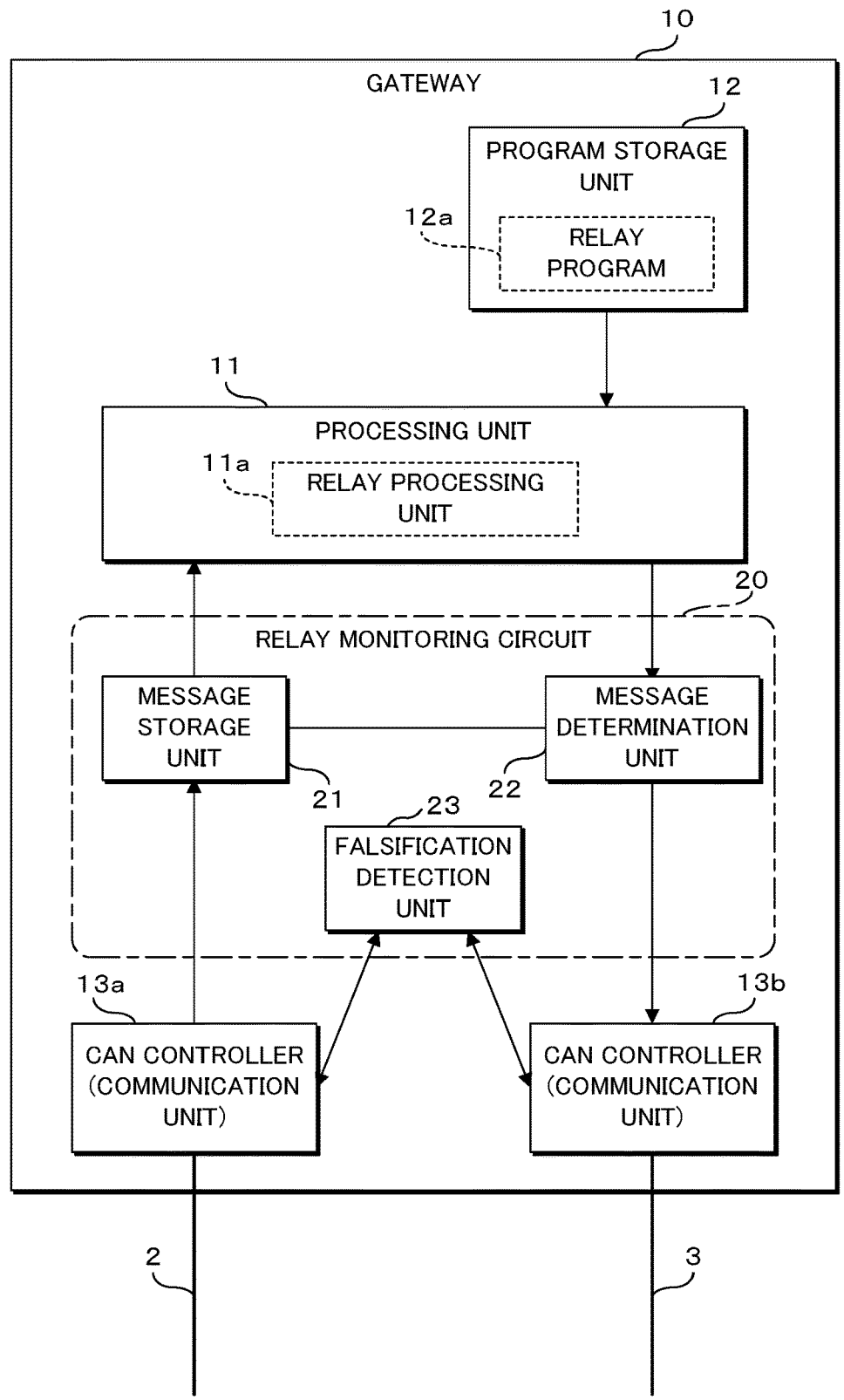
FIG. 2 is a block diagram illustrating the configuration of a gateway according to an embodiment of the present disclosure.

FIG. 2 is a block diagram illustrating the configuration of the gateway 10 according to the present embodiment. The gateway 10 according to the present embodiment is configured to include a processing unit (processor) 11, a program storage unit 12, two CAN controllers (transceivers) 13a, 13b and a relay monitoring circuit 20. The processing unit 11 is configured with an arithmetic processing device such as a central processing unit (CPU) or a micro-processing unit (MPU), for example. The processing unit 11 reads out and executes the relay program 12a stored in the program storage unit 12. Accordingly, in the processing unit 11, a relay processing unit 11a performing relay processing of a message is implemented as a software functional block.

The program storage unit 12 is configured with a non-volatile memory element such as an electrically erasable programmable read only memory (EEPROM) or a flash memory. The program storage unit 12 stores in advance a relay program 12a executed by the processing unit 11. Furthermore, the program storage unit 12 may further store various types of data to be used in the relay processing, another program different from the relay program 12a, or the like.

The CAN controllers 13a and 13b are respectively connected to the communication lines 2 and 3, through which messages are transmitted and received between the ECU 4 and the CAN controllers 13a and 13b. The CAN controllers 13a and 13b receive messages by sampling and obtaining signals output by the ECU 4 to the communication lines 2 and 3. The messages received by the CAN controllers 13a and 13b pass through the relay monitoring circuit 20 and are sent to the processing unit 11. Moreover, to the CAN controllers 13a and 13b, messages to be relayed are sent from the processing unit 11 through the relay monitoring circuit 20. The CAN controllers 13a and 13b transmit messages to the ECU 4 by outputting the sent messages as signals onto the communication lines 2 and 3.

It is assumed in FIG. 2 and the description below that the CAN controller 13a receives a message while the CAN controller 13b transmits a message. This is however a mere example, and it is also possible that the CAN controller 13b receives a message while the CAN controller 13a transmits a message. The CAN controllers 13a and 13b are capable of both transmitting and receiving messages.

The relay processing unit 11a implemented in the processing unit 11 sends the message received by one CAN controller 13a to the other CAN controller 13b which in turn transmits the message, to relay the message between the communication lines 2 and 3 (i.e. between an ECU 4 in the first group and an ECU 4 in the second group). Here, the relay processing unit 11a may perform processing such as scheduling of adjusting the order of relaying messages or filtering of eliminating an improper message, for example.

The relay monitoring circuit 20 is located between the processing unit 11 and the CAN controllers 13a and 13b, to monitor a message relayed between the communication lines 2 and 3. It is noted that the conventional gateway is not provided with the relay monitoring circuit 20, so that a message received by the CAN controller 13a or 13b is directly sent to the processing unit 11 while a message to be relayed from the processing unit 11 is directly sent to the CAN controller 13a or 13b. The relay monitoring circuit 20 is configured to include a message storage unit 21, a message determination unit 22, a falsification detection unit 23 and so forth. In the present embodiment, the relay monitoring circuit 20 is implemented as a hardware.

The message storage unit 21 is configured with a memory element such as a static random access memory (SRAM) or a dynamic random access memory (DRAM), for example. The relay monitoring circuit 20 stores a message received by the CAN controller 13a into the message storage unit 21, and thereafter sends the message to the processing unit 11. In the processing unit 11 to which the message is sent from the relay monitoring circuit 20, the relay processing described above is performed by the relay processing unit 11a, and the message to be relayed is sent from the processing unit 11 to the relay monitoring circuit 20 as a result of the relay processing.

The message determination unit 22 in the relay monitoring circuit 20 determines whether or not the message sent from the processing unit 11 matches with the message stored in the message storage unit 21. Accordingly, the message determination unit 22 confirms that no improper falsification or the like is made on the message to be relayed in the processing unit 11. If it is determined that the messages match with each other, the message determination unit 22 determines that no improper falsification is made, and sends the message sent from the processing unit 11 to the CAN controller 13b. The CAN controller 13b to which the message is sent from the relay monitoring circuit 20 outputs the sent message as an electric signal onto the communication line 3, to transmit the message. If, on the other hand, the message determination unit 22 determines that the messages do not match with each other, the relay monitoring circuit 20 discards the message sent from the processing unit 11 without transmitting it.

The message storage unit 21 in the relay monitoring circuit 20 may store multiple messages therein. Thus, the message determination unit 22 compares the message sent from the processing unit 11 with multiple messages stored in the message storage unit 21 in turns, and determines that no improper falsification is made if the sent message matches with any one of the stored messages. If the message sent from the processing unit 11 matches with none of the messages stored in the message storage unit 21, the message determination unit 22 determines that improper falsification is made and discards the message without transmitting it.

The message storage unit 21 in the relay monitoring circuit 20 according to the present embodiment stores information of all bits for the message received by the CAN controller 13a or 13b. That is, in the message according to the CAN communication protocol, information of all bits from SOF to EOF is stored (SOF and EOF may however be excluded). In the case where the message stored in the message storage unit 21 is compared with the message sent from the processing unit 11, the message determination unit 22 determines whether or not the both messages match with one another for all the bits therein.

The message storage unit 21 in the relay monitoring circuit 20 may also be configured to store only a portion of the message received by the CAN controller 13a or 13b. In such a configuration, the message determination unit 22 may compare a portion of the message stored in the message storage unit 21 with a portion of the message sent from the processing unit 11. As to a portion stored in the message storage unit 21, the CAN-ID and CRC may preferably be stored for any message according to the CAN communication protocol, for example. Such a configuration can reduce the stored content of the message storage unit 21 and can facilitate the determination processing performed by the message determination unit 22, which can suppress an increase in the circuit scale of the relay monitoring circuit 20.

After storing the message received by the CAN controller 13a or 13b, the message storage unit 21 in the relay monitoring circuit 20 continues to store the message until the stored message is used for determination in the message determination unit 22 and is determined to match with the message sent from the processing unit 11. That is, the message storage unit 21 continues to store the received message until the message is relayed through authorized relay processing. If, however, a predetermined period of time elapses after storing a message, the message storage unit 21 may discard the message even before the message is relayed. Moreover, the message storage unit 21 may continue to store as many messages as possible, and if the limit of the stored content is reached so that it can store no more messages therein, may discard the messages in chronological order.

The falsification detection unit 23 in the relay monitoring circuit 20 according to the present embodiment monitors whether or not a message, which had been determined as not falsified by the message determination unit 22 and sent to the CAN controllers 13a or 13b, is falsified on the communication line 2 or 3 while being transmitted from the CAN controller 13a or 13b. In transmitting a message, the CAN controller 13a or 13b outputs an electric signal corresponding to each bit of the message onto the communication line 2 or 3, while sampling and obtaining the signals on the communication line 2 or 3. The falsification detection unit 23 in the relay monitoring circuit 20 obtains digital data according to a signal obtained in transmitting a message by the CAN controller 13a or 13b for each bit in the message transmission. The falsification detection unit 23 determines for each bit whether or not the data of one bit which is to be transmitted in the message that had been sent to the CAN controller 13a or 13b as the message to be relayed matches with the data obtained by the CAN controller 13a or 13b in message transmission. In the case where the both data do not match with each other, the falsification detection unit 23 determines that improper falsification is made on the communication line 2 or 3, and aborts message transmission by making the CAN controller 13a or 13b transmit an error frame according to the CAN communication protocol.

Figure 3:
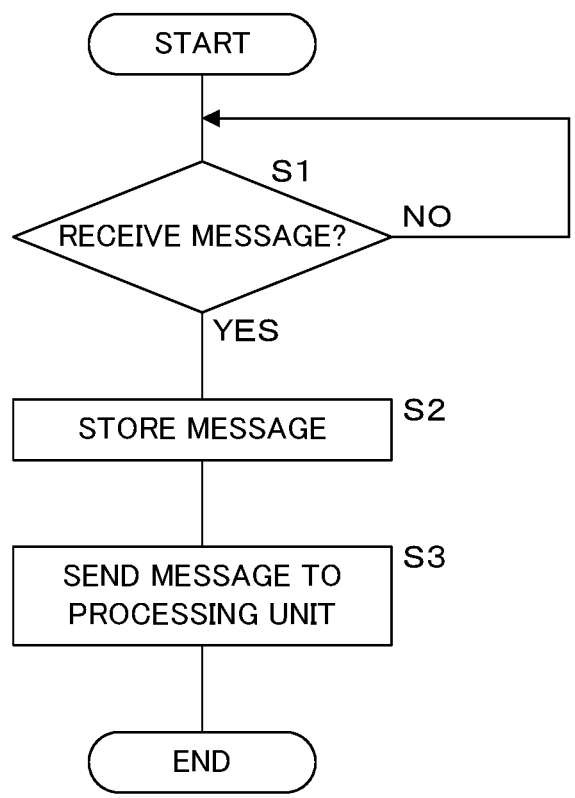
FIG. 3 is a flowchart illustrating a procedure of processing performed by a relay monitoring circuit during message reception.

FIG. 3 is a flowchart illustrating a procedure of processing performed by the relay monitoring circuit 20 in message reception. The relay monitoring circuit 20 determines whether or not a message is received by either one of the CAN controllers 13a and 13b (step S1). If no message is received by either one of the CAN controllers 13a and 13b (S1: NO), the relay monitoring circuit 20 waits until a message is received by either one of the CAN controllers 13a and 13b. If a message is received by either one of the CAN controllers 13a and 13b (S1: YES), the relay monitoring circuit 20 obtains the message received by the CAN controller 13a or 13b and stores the message in the message storage unit 21 (step S2). Subsequently, the relay monitoring circuit 20 sends the message received by the CAN controller 13a or 13b to the processing unit 11 (step S3), and terminates the processing.

Figure 4:
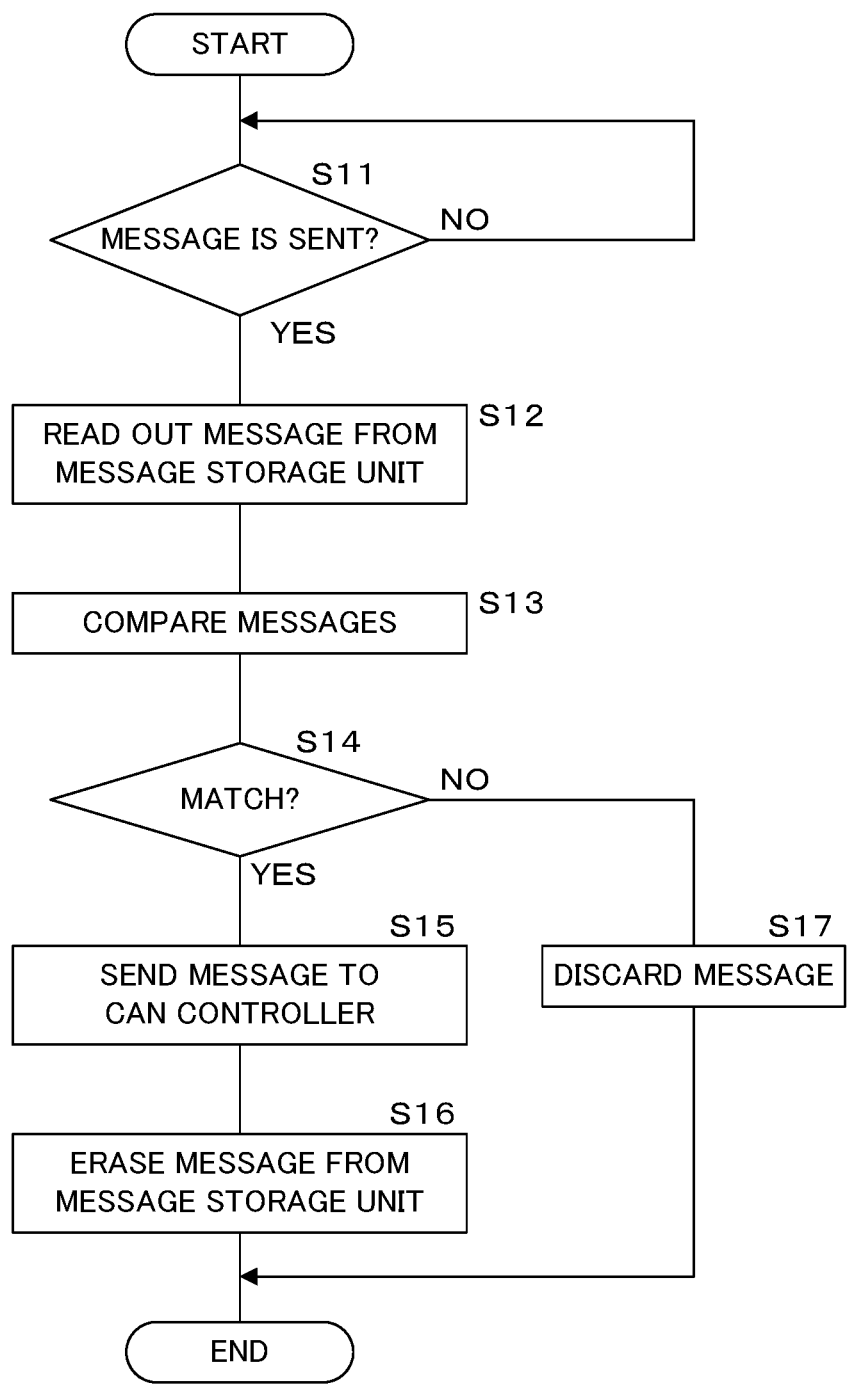
FIG. 4 is a flowchart illustrating a procedure of processing performed by the relay monitoring circuit in the case of receiving a message to be relayed.

FIG. 4 is a flowchart illustrating a procedure of processing performed by the relay monitoring circuit 20 in the case of receiving a message to be relayed. The relay monitoring circuit 20 determines whether or not a message to be relayed is sent from the processing unit 11 (step S11). If no message is sent from the processing unit 11 (S11: NO), the relay monitoring circuit 20 waits until a message to be relayed is sent. If a message is sent from the processing unit 11 (S11: YES), the relay monitoring circuit 20 reads out a message stored in the message storage unit 21 (step S12) and compares it with the message sent from the processing unit (step S13).

As a result of comparing the messages, the relay monitoring circuit 20 determines whether or not the both messages match with each other (step S14). If the both messages match with each other (S14: YES), the relay monitoring circuit 20 sends the sent message to the CAN controller 13a or 13b (step S15) to transmit the message. Moreover, the relay monitoring circuit 20 erases from the message storage unit 21 the message which is finished being relayed (step S16), and terminates the processing. Furthermore, if the both messages do not match with each other (S14: NO), the relay monitoring circuit 20 discards the sent message (step S17) and terminates the processing.

Figure 5:
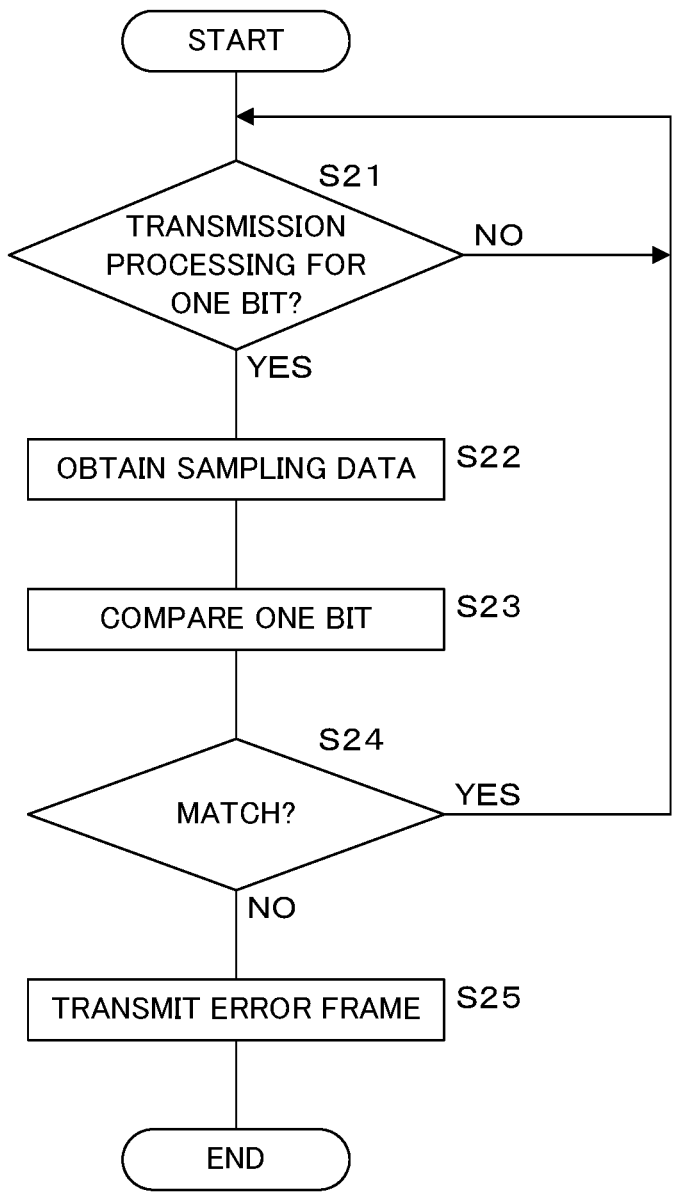
FIG. 5 is a flowchart illustrating a procedure of processing performed by the relay monitoring circuit during transmission of a message.

FIG. 5 is a flowchart illustrating a procedure of processing performed by the relay monitoring circuit 20 during message transmission. The falsification detection unit 23 in the relay monitoring circuit 20 determines whether or not transmission processing for one bit of a message is performed in the CAN controller 13a or 13b (step S21). If the transmission processing for one bit is not performed (S21: NO), the falsification detection unit 23 waits until the transmission processing is performed. If the transmission processing for one bit is performed (S21: YES), the falsification detection unit 23 obtains sampling data of one bit, which is a result of sampling on the communication line 2 or 3 performed together with the signal output corresponding to one bit, from the CAN controller 13a or 13b (step S22).

The falsification detection unit 23 compares the obtained sampling data with the data of one bit in the message to be transmitted (step S23). Based on the result of comparison, the falsification detection unit 23 determines whether or not the both data match with each other (step S24). If the both data match with each other (S24: YES), the falsification detection unit 23 returns the processing to step S21. If the both data do not match with each other (S24: NO), the falsification detection unit 23 makes the CAN controller 13a or 13b transmit an error frame (step S25) and terminates the processing.

The gateway 10 according to Embodiment 1 with the configuration described above comprises multiple CAN controllers 13a and 13b connected to the communication lines 2 and 3, respectively. The processing unit 11 executes the relay program 12a to perform processing of message relay in which a message received by one of the CAN controllers 13a and 13b is transmitted from the other one of the CAN controllers 13a and 13b. The gateway 10 comprises, separately from the processing unit 11, a message storage unit 21 in which messages received by the CAN controllers 13a and 13b are stored. In the case where a message is received by one of the CAN controllers 13a and 13b from another ECU 4 through the communication line 2 or 3, the message received by the CAN controller 13a or 13b is stored in the message storage unit 21 and is also sent to the processing unit 11. The processing unit 11 to which the message is sent performs processing necessary for relay of the message by executing the relay program 12a. The processing unit 11 sends a message to be relayed to the CAN controller 13a or 13b connected to the ECU 4 which is to relay the message. The CAN controller 13a or 13b to which the message to be relayed is sent from the processing unit 11 then transmits a signal according to this message onto the communication line 2 or 3 to perform message transmission.

In the gateway 10 according to the present embodiment, however, the message before being sent from the CAN controller 13a or 13b to the processing unit 11 is compared with the message sent from the processing unit 11 to the CAN controller 13a or 13b, and the message determination unit 22 determines the properness of the message. That is, the gateway 10 may determine whether or not the message to be relayed is not falsified in the processing unit 11 and prohibit transmission of an improper message, to prevent transmission of an improper message from the gateway 10 to another ECU 4.

Moreover, the gateway 10 compares the message received by the CAN controller 13a or 13b and stored in the message storage unit 21 with the message to be relayed that is sent from the processing unit 11 to the CAN controller 13a or 13b. Based on the result of such comparison, the gateway 10 determines whether or not the both messages match with each other and determines whether or not the message to be relayed is a proper one. Accordingly, the gateway 10 may reliably determine the presence or absence of falsification of a message in the processing unit 11 by merely performing simple comparison processing.

Moreover, the message storage unit 21 in the gateway 10 may store therein multiple messages received by the CAN controllers 13a and 13b. In the case where a message to be relayed is sent from the processing unit 11 to the CAN controller 13a or 13b, the gateway 10 determines that the sent message is proper if the message matches with any one of the messages stored in the storage unit 21. Accordingly, even if relay processing such as scheduling is performed in the processing unit 11 and the order of relay is different from the order of reception, the gateway 10 may reliably determine the presence or absence of falsification of a message.

It is noted that the gateway 10 may also be configured to store a portion of the received messages in the message storage unit 21, not all of them. In this case, the gateway 10 determines whether or not a portion of a message to be relayed that is sent from the processing unit 11 to the CAN controller 13a or 13b matches with a portion of the messages stored in the message storage unit 21, to determine whether or not the message to be relayed is a proper one. By comparing portions of the messages, the stored content in the message storage unit 21 may be reduced. The portions of the messages used for comparison may be, for example, ID and CRC contained in a message according to the CAN communication protocol.

Furthermore, the gateway 10 may relay a message by the CAN controller 13a or 13b outputting the message determined as proper onto the communication line 2 or 3. Here, the gateway 10 detects falsification to the message transmitted by the CAN controller 13a or 13b. The gateway 10 detects falsification of the message by determining whether or not a correct message is transmitted as a result of sampling and comparison of signals on the communication line 2 or 3 every time the CAN controller 13a or 13b outputs a signal according to one bit of the message onto the communication line 2 or 3. If falsification of the message is detected, the gateway 10 aborts message transmission by making the CAN controller 13a or 13b transmit an error frame. Accordingly, for any falsification made by an external malicious device to a message to be transmitted by the gateway 10, the gateway 10 may abort the transmission of the message, thereby preventing the ECU 4 from receiving a falsified message.

While the configuration where two communication lines 2 and 3 are connected to the gateway 10 is employed in the present embodiment, it is not limited thereto but another configuration where three or more communication lines are connected thereto may also be employed. In such a case, the gateway 10 may relay a message received by one communication line to the other two communication lines. While the configuration where three ECUs 4 are connected to each of the communication lines 2 and 3 is employed in the present embodiment, the configuration is not limited thereto. Any number of ECUs 4 may be connected to each of the communication lines 2 and 3.

Moreover, while in the present embodiment the gateway 10 is configured to include the message storage unit 21 and the message determination unit 22 as one hardware, i.e. the relay monitoring circuit 20, the configuration is not limited thereto. Each of the message storage unit 21 and the message determination unit 22 may also be provided as an individual hardware. It is however noted that each of the message storage unit 21 and the message determination unit 22 may be implemented as a separate hardware different from the processing unit 11, not implemented as software functional blocks executed by the processing unit 11.

While the gateway 10 and ECU 4 are configured to communicate according to the CAN communication protocol in the present embodiment, the configuration is not limited thereto. The gateway 10 and ECU 4 may also be configured to communicate according to a communication protocol other than CAN, such as TCP/IP, Ethernet (registered trademark) or FlexRay, for example. While the communication system mounted to the vehicle 1 has been described as an example, the present technique may also be applied to a communication system other than the ones mounted to a vehicle, such as a communication system mounted to a movable object such as an airplane or a vessel, or a communication system installed in a factory, an office or the like, not limited to the described example.

Embodiment 2

Figure 6:
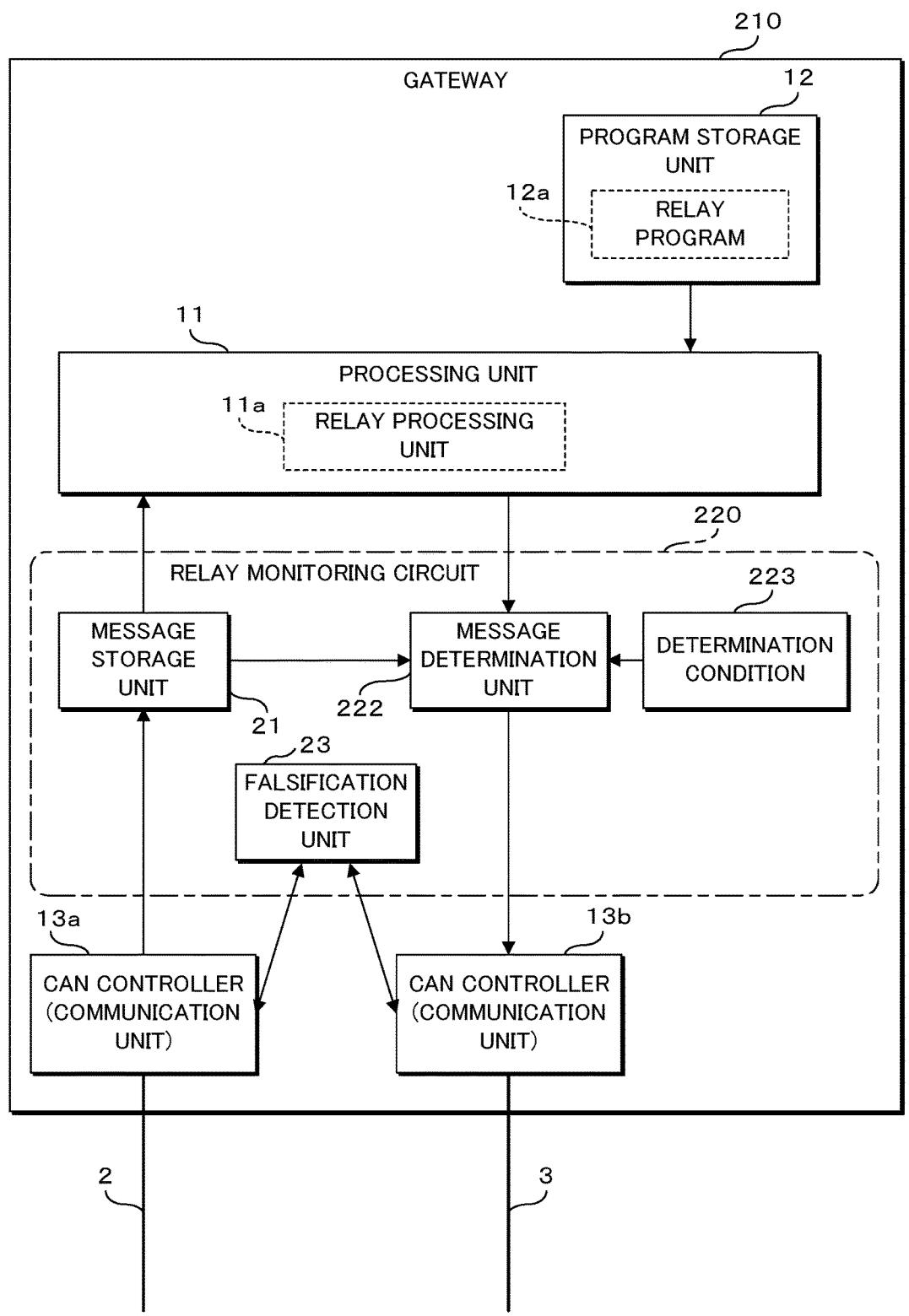
FIG. 6 is a block diagram illustrating the configuration of a gateway according to Embodiment 2.

FIG. 6 is a block diagram illustrating the configuration of a gateway 210 according to Embodiment 2. The gateway 10 according to Embodiment 1 described above is configured on the premise that it performs processing such as scheduling in the relay processing by the processing unit 11 but no such processing as to change the content of a message. On the other hand, the gateway 210 according to Embodiment 2 is allowed to perform, for example, processing of generating one message for relay by integrating multiple messages or processing of generating multiple messages for relay by dividing one message into multiple messages during the relay processing performed by the processing unit 11.

The relay monitoring circuit 220 in the gateway 210 according to Embodiment 2 comprises a message storage unit 21, a message determination unit 222 and a determination condition storage unit 223 (indicated simply as "determination condition" in FIG. 6). The determination condition storage unit 223 stores therein a condition for determination made by the message determination unit 222. The determination condition storage unit 223 is configured with a memory element such as an EEPROM or a flash memory, for example. The determination condition storage unit 223 may, however, use a memory element such as a mask read only memory (ROM) incapable of rewriting data or an erasable programmable read only memory (EPROM) incapable of electrically rewriting data, to enhance the security. In the case of using any memory element, the determination condition storage unit 223 may preferably be configured to employ a method of, for example, holding data in a tamper-resistant memory such that the processing unit 11 cannot directly read or write data. The message determination unit 222 reads out a determination condition from the determination condition storage unit 223 at the time of activating the gateway 210, for example, and determines the properness of a message in accordance with the read-out determination condition.

Figure 7:
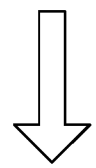
FIG. 7 is a schematic view for illustrating integration of messages.

FIG. 7 is a schematic view for illustrating integration of messages. FIG. 7 is an example where the processing unit 11 integrates three messages received by the CAN controller 13a through the communication line 2 into one message and generates a message for relay, which is transmitted from the CAN controller 13b to the ECU 4 through the communication line 3. In this case, the multiple messages received by the CAN controller 13a are stored in the message storage unit 21 in turns and are also sent to the processing unit 11. If it is determined that all the required messages are present, the processing unit 11 extracts necessary information (data 1, data 2 and data 3) from each of the three messages, and obtains a message for relay by connecting the extracted three pieces of information and adding a header portion as well as a footer portion thereto. In the case of a message according to the CAN communication protocol, the illustrated header portion includes an SOF, an arbitration field, a control field and so forth, whereas the footer portion includes a CRC field, an ACK field, an EOF and so forth.

The message determination unit 222 to which a message for relay is sent from the processing unit 11 requires to determine the properness of the message for relay by comparing this message for relay with a message stored in the message storage unit 21. Since the header portion and the footer portion may be changed by integration of messages, the message determination unit 222 compares multiple pieces of data contained in the message for relay with data contained in multiple messages stored in the message storage unit 21. Here, the message determination unit 222 may make a determination while setting, as a condition for properness, a match between all of the three data 1, 2 and 3 contained in the message for relay, for example, and the data 1, 2 and 3 contained in the message stored in the message storage unit 21. The message determination unit 222 may further make a determination while setting, as a condition for properness, a match between any one of the three data 1, 2 and 3 contained in the message for relay, for example, and data 1, 2 and 3 contained in the message stored in the message storage unit 21. In the case where a determination is made on the match for any one of the data 1, 2 and 3 contained in the message for relay, the determination may be made only for the latest data based on the reception time, for example. These determination conditions are decided in advance at the design stage or the like of the gateway 210, and are stored in the determination condition storage unit 223.

Figure 8:
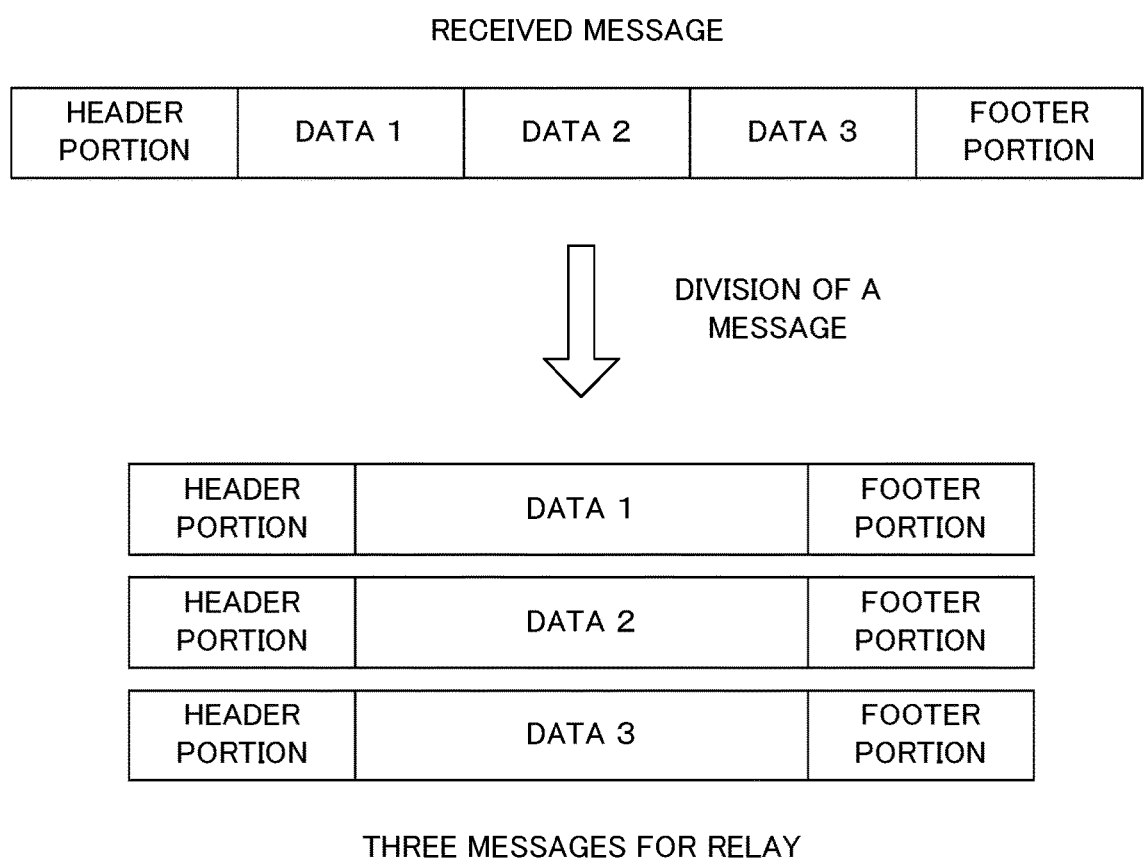
FIG. 8 is a schematic view for illustrating division of a message.

FIG. 8 is a schematic view for illustrating division of a message. FIG. 8 is an example where a message received by the CAN controller 13a through the communication line 2 contains three data 1, 2 and 3, the processing unit 11 to which the message is sent divides the sent message into three messages for relay, and the divided three messages for relay are transmitted in turns from the CAN controller 13b to the ECU 4 through the communication line 3. In this case, the messages received by the CAN controller 13a are stored in the message storage unit 21 and are also sent to the processing unit 11. If it is determined that the sent message contains multiple data 1, 2 and 3, the processing unit 11 extracts three data 1, 2 and 3 from the message and adds a header portion as well as a footer portion to each of the data 1, 2 and 3 to obtain a message for relay.

The message determination unit 222 to which a message for relay is sent from the processing unit 11 is required to determine the properness of the message for relay by comparing this message for relay with a message stored in the message storage unit 21. For example, the message determination unit 222 to which a message for relay containing data 1 is sent determines whether or not a message containing data 1 is present in one or more messages stored in the message storage unit 21, to determine the properness of the message for relay. Even if the message for relay containing the data 1 is transmitted by the CAN controller 13*b*, the message storage unit 21 needs to store the received message containing the data 1, 2 and 3 without erasing the message. This is because the message determination unit 222 makes a further determination if a message for relay containing the data 2 and 3 is subsequently sent from the processing unit 11. Thus, the message storage unit 21 may be configured to erase a message after confirming that comparison by the message determination unit 222 is completed for all the data contained in the stored message, for example. Alternatively, the message storage unit 21 may be configured to erase a message if, for example, a predetermined period of time has elapsed from the reception of the message or a predetermined period of time has elapsed since the comparison for any one of the data is made by the message determination unit 222.

FIG. 9 is a schematic view illustrating an example of determination conditions stored in the determination condition storage unit 223. In the illustrated determination conditions, information on a relay source communication line, a CAN-ID, a data comparison range and a CRC necessity are set as transfer source information (information related to the message received by the CAN controller 13*a* or 13*b*). For the determination conditions, as transfer destination information (information related to a message for transmission that is sent from the processing unit 11 to the CAN controller 13*a* or 13*b*), information such as a relay destination communication line, a CAN-ID, a data comparison range, a comparison method and a relay rule may be set.

The setting for the relay source communication line contained in the transfer source information indicates whether the communication line 2 or 3 is used to receive a message. The CAN-ID indicates a CAN-ID attached to the received message. The data comparison range indicates a range used for comparison, out of the data (64 bits in the present example) contained in the received message, in a manner of "start bit-end bit." The CRC necessity indicates whether or not comparison for the CRC contained in the message is necessary.

The setting for the relay destination communication line contained in the transfer destination information indicates whether the communication line 2 or 3 is to receive a message. The CAN-ID indicates a CAN-ID attached to the transmission message sent from the processing unit 11. The data comparison range indicates a range used for comparison, out of the data (64 bits in the present example) contained in the transmission message, in a manner of "start bit-end bit." As the comparison method, either one of a method 1 performing comparison for data and a method 2 performing comparison for CRC is set. As for the relay rule, either one of a rule 1 where the transmission message sent from the processing unit 11 is relayed if it matches with the latest message stored in the storage unit 21 or a rule 2 where the transmission message is relayed if it matches with any one of the messages stored in the message storage unit 21 is set.

In the first example indicated in the determination conditions in FIG. 9, 0 to 63 bits of the data contained in the message with the CAN-ID of 2, which is received by the CAN controller 13*a* through the communication line 2 and stored in the message storage unit 21, are compared with 0 to 63 bits of the data contained in the message with the CAN-ID of 2 which is sent from the processing unit 11 to the CAN controller 13*b* and is to be transmitted to the communication line 3, and if both data match with each other, the CAN controller 13*b* transmits the message to the communication line 3. It is noted that the comparison of messages may be made for the latest message stored in the message storage unit 21 and the message sent from the processing unit 11.

In the second example indicated in the determination conditions in FIG. 9, 0 to 7 bits of the data contained in the message with the CAN-ID of 10, which is received by the CAN controller 13*a* through the communication line 2 and stored in the message storage unit 21, are compared with 0 to 7 bits of the data contained in the message with the CAN-ID of 10 which is sent from the processing unit 11 to the CAN controller 13*b* and is to be transmitted to the communication line 3, and if both data match with each other, the CAN controller 13*b* transmits the message to the communication line 3. It is noted that the comparison of messages may be made for all the messages stored in the message storage unit 21 and the message sent from the processing unit 11, and transmission may be performed if any one of the messages shows a match.

In the third example indicated in the determination conditions in FIG. 9, 8 to 63 bits of the data contained in the message with the CAN-ID of 10 which is received by the CAN controller 13*a* through the communication line 2 and stored in the message storage unit 21, are compared with 8 to 63 bits of the data contained in the message with the CAN-ID of 20 which is sent from the processing unit 11 to the CAN controller 13*b* and is to be transmitted to the communication line 3, and if both data match with each other, the CAN controller 13*b* transmits the message to the communication line 3. It is noted that the comparison of messages may be made for all the messages stored in the message storage unit 21 and the message sent from the processing unit 11, and if any one of the messages shows a match, transmission may be performed.

In the fourth example indicated in the determination conditions in FIG. 9, the CRC contained in the message with the CAN-ID of 30 which is received by the CAN controller 13*a* through the communication line 2 and stored in the message storage unit 21 is compared with the CRC contained in the message with the CAN-ID of 10 which is sent from the processing unit 11 to the CAN controller 13*b* and is to be transmitted to the communication line 3, and if both CRCs match with each other, the CAN controller 13*b* transmits the message to the communication line 3. It is noted that the comparison of messages may be made for all the messages stored in the message storage unit 21 and the message sent from the processing unit 11, and if any one of the messages shows a match, transmission may be performed.

Figure 10:
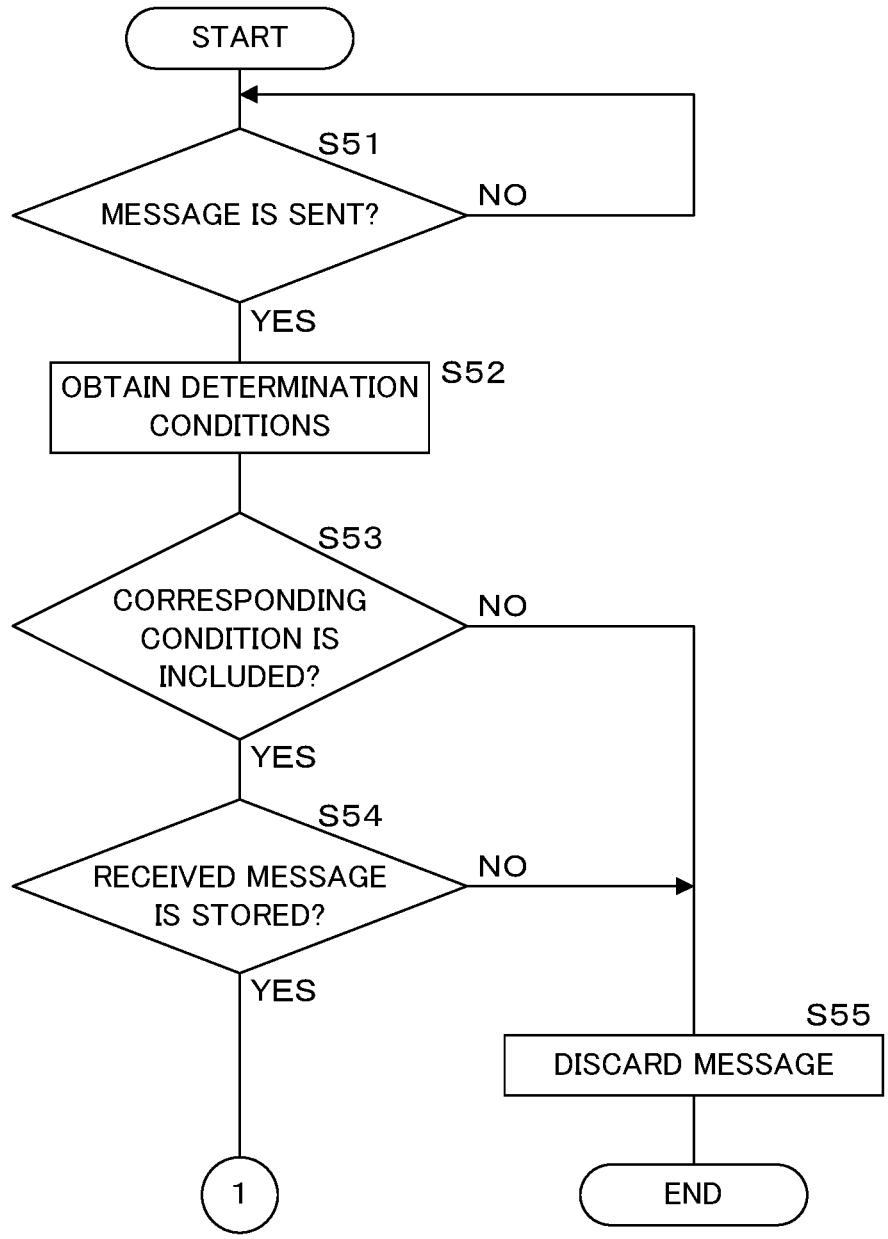
FIG. 10 is a flowchart illustrating a procedure of processing performed by a relay monitoring circuit according to Embodiment 2.
Figure 11:
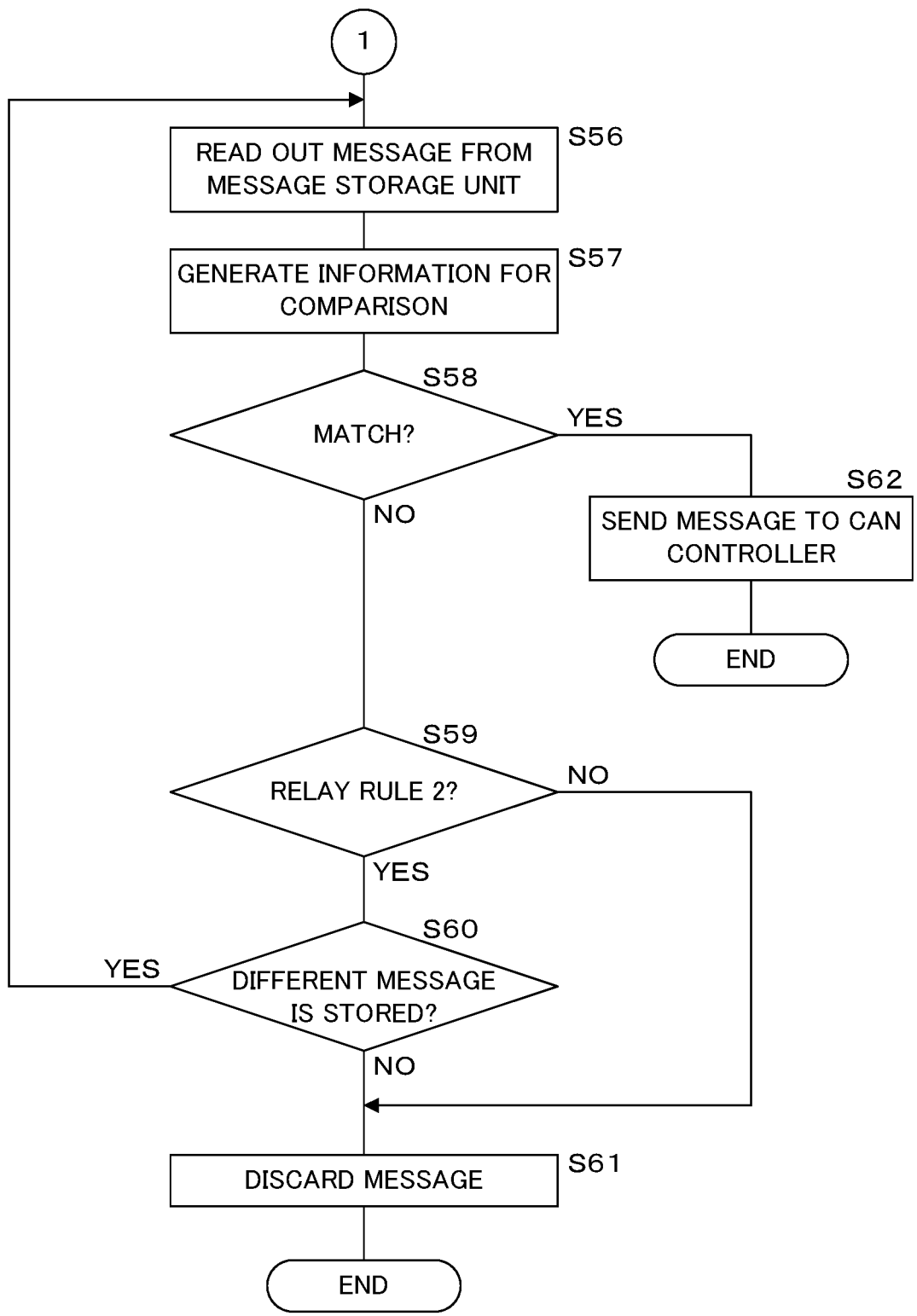
FIG. 11 is a flowchart illustrating a procedure of processing performed by the relay monitoring circuit according to Embodiment 2.

FIGS. 10 and 11 are flowcharts illustrating a procedure of processing performed by the relay monitoring circuit 220 according to Embodiment 2. The relay monitoring circuit 220 determines whether or not a message to be relayed is sent from the processing unit 11 (step S51). If no message is sent from the processing unit 11 (S51: NO), the relay monitoring circuit 220 waits until a message to be relayed is sent.

If a message is sent from the processing unit 11 (S51: YES), the relay monitoring circuit 220 obtains determination conditions stored in the determination condition storage unit 223 (step S52). The relay monitoring circuit 220 determines whether or not a condition corresponding to the CAN-ID attached to the message sent at step S51 is included in the transfer destination information in the determination conditions obtained at step S52 (step S53). If the corresponding condition is not included (S53: NO), the relay monitoring circuit 20 discards the message (step S55) and terminates the processing.

If the corresponding condition is included (S53: YES), the relay monitoring circuit 220 determines whether or not the message having the CAN-ID set to the transfer source information under this condition is stored in the message storage unit 21 (step S54). If the message is not stored (S54: NO), the relay monitoring circuit 20 discards the message (step S55) and terminates the processing.

If the message is stored (S54: YES), the relay monitoring circuit 220 reads out a message from the message storage unit 21 (step S56). The relay monitoring circuit 220 generates information for comparison from each of the message read out at step S56 and the message sent at step S51 (step S57). Here, the relay monitoring circuit 220 may generate information for comparison by extracting data of bits or CRC designated by the determination condition from the message.

The relay monitoring circuit 220 compares the generated two information for comparison, and determines whether or not the information match with each other (step S58). If the information do not match with each other (S58: NO), the relay monitoring circuit 220 determines whether or not a relay rule set under the determination condition is the rule 2 (step S59). If the relay rule is the rule 1 (S59: NO), the relay monitoring circuit 220 discards the message (step S61) and terminates the processing.

If the relay rule is the rule 2 (S59: YES), the relay monitoring circuit 220 determines whether or not a different message to be used in comparison is stored in the message storage unit 21 (step S60). If the different message is not stored (S60: NO), the relay monitoring circuit 220 discards the current message (step S61) and terminates the processing. If the different message is stored (S60: YES), the relay monitoring circuit 220 returns the processing to step S56, reads out the next message and repeats the processing describe above.

If the generated two pieces of information for comparison match with each other at step S58 (S58: YES), the relay monitoring circuit 220 sends a message for transmission to the CAN controller 13a or 13b (step S62), transmits the message and terminates the processing.

By the processing unit 11 executing the relay program 12a, the gateway 210 according to Embodiment 2 configured as described above may integrate multiple messages, or may divide one message into multiple messages, to generate a message for relay. The gateway 210 determines whether or not a portion (data portion) of the message for relay that is sent from the processing unit 11 to the CAN controller 13a or 13b matches with a portion of one or more messages stored in the message storage unit 21, to determine whether or not the message for relay is a proper one. Accordingly, even if processing such as integration, dividing or the like of the message is performed in the processing unit 11, the gateway 210 according to Embodiment 2 may determine the presence or absence of falsification of the message in the processing unit 11.

While Embodiment 2 described a configuration where the relay monitoring circuit 220 in the gateway 210 includes the determination condition storage unit 223 and the message determination unit 222 performs determination processing in accordance with the determination conditions stored in the determination condition storage unit 223, the configuration is not limited thereto. A configuration where the relay monitoring circuit 220 is not provided with the determination condition storage unit 223 and the message determination unit 222 performs determination processing in accordance with determination conditions defined in a circuitry manner. While the processing unit 11 in the gateway 210 is configured to be capable of performing both message integration and message dividing, it is not limited thereto but may also be configured to be capable of either message integration or message dividing.

Since the gateway 210 and the other parts according to Embodiment 2 are configured similarly to the gateway 10 according to Embodiment 1, like parts are denoted by the same reference codes and will not be described in detail.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A relay device comprising a plurality of communication units each of which is connected to a communication line to perform transmission and reception of a message through the communication line, the relay device relaying a message between the communication units, further comprising:
   a message storage unit in which a message received by the communication unit is stored;
   a program storage unit in which a software program for performing relay processing of a message is stored;
   a processing unit performing relay processing of a message by executing the software program stored in the program storage unit; and
   a determination unit determining properness of a message to be relayed if the message is sent from the processing unit to the communication unit, based on a message stored in the message storage unit,
   wherein
   in a case of receiving a message at one communication unit, the message is stored in the message storage unit while being sent to the processing unit,
   the processing unit outputs a message for relay that is to be transmitted by a different communication unit based on a sent message, and
   the determination unit compares the message for relay output by the processing unit with a message stored in the message storage unit to determine properness of the message for relay, and sends the message for relay determined as proper to the different communication unit.

2. The relay device according to claim 1, further comprising
a prohibition unit that prohibits transmission by the communication unit of a message determined as improper by the determination unit.

3. The relay device according to claim 1, wherein
the determination unit determines that a message to be relayed that is sent from the processing unit to the communication unit is proper if the message to be relayed matches with a message stored in the message storage unit.

4. The relay device according to claim 3, wherein
the determination unit determines that a message to be relayed that is sent from the processing unit to the communication unit is proper if the message to be relayed matches with any one of messages stored in the message storage unit, and
the message storage unit deletes the message determined as proper by the determination unit and relayed.

5. The relay device according to claim 1, wherein
the determination unit determines that a message to be relayed that is sent from the processing unit to the communication unit is proper if one portion of the message to be relayed matches with one portion of a message stored in the message storage unit.

6. The relay device according to claim 5, wherein
the message is a message in accordance with a CAN communication protocol, and
the one portion corresponds to an ID and a CRC contained in the message.

7. The relay device according to claim 3, wherein
the processing unit executes the software program stored in the program storage unit to generate a message for relay by integrating multiple messages obtained from one or more communication units, and
the determination unit determines that the message for relay that is sent from the processing unit to the communication unit is proper if one portion of the message for relay matches with one portion of one or more messages stored in the message storage unit.

8. The relay device according to claim 3, wherein
the processing unit executes the software program stored in the program storage unit to generate a plurality of messages for relay by dividing a message obtained from the communication unit, and
the determination unit determines that the messages for relay that are sent from the processing unit to the communication unit are proper if one portion of the messages for relay matches with one portion of a message stored in the message storage unit.

9. The relay device according to claim 1, comprising:
a detection unit that detects falsification to a transmitted message while the communication unit transmits a message determined as proper by the determination unit; and
an abort unit that aborts message transmission by the communication unit if the detection unit detects falsification.

* * * * *